(12) United States Patent
Kim

(10) Patent No.: US 6,256,165 B1
(45) Date of Patent: Jul. 3, 2001

(54) EASY TO MANUFACTURE COVERING DEVICE OF A HARD DISK DRIVE THAT DAMPENS VIBRATIONS AND SEALS INTERNAL COMPONENTS WITHIN

(75) Inventor: Youn-Tai Kim, Kwachon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/289,727

(22) Filed: Apr. 12, 1999

(30) Foreign Application Priority Data

Apr. 11, 1998 (KR) ................................................. 98-12940

(51) Int. Cl.⁷ .................................................. G11B 33/14
(52) U.S. Cl. ........................................................ 360/97.01
(58) Field of Search ........................................... 360/97.01

(56) References Cited

U.S. PATENT DOCUMENTS

| | | | |
|---|---|---|---|
| 5,366,200 | 11/1994 | Scura | 248/632 |
| 5,483,397 | 1/1996 | Gifford et al. | 360/97.01 |
| 5,587,855 | 12/1996 | Kim | 360/97.02 |
| 5,668,791 | 9/1997 | Yamada et al. | 369/247 |
| 5,768,051 | 6/1998 | Kora et al. | 360/99.08 |
| 5,781,373 | 7/1998 | Larson et al. | 360/97.02 |

*Primary Examiner*—George J. Letscher
(74) *Attorney, Agent, or Firm*—Robert E. Bushnell, Esq.

(57) ABSTRACT

A covering device of a hard disk drive including a spindle motor having a rotating shaft for rotating a disk, an actuator pivoting about a pivot shaft and having at its distal end a head for reading/writing data while pivoting over the disk, a base for mounting the spindle motor and the actuator thereon, and a cover locked to the base and made of plastic. The covering device comprises at least one thin plate attached to the cover such that it is coaxially arranged with the rotating shaft and/or the pivot shaft, for dampening vibration and noise transferred from around the rotating shaft and/or the pivot shaft to the cover. In one embodiment, the thin plate contains slits to more effectively dampen noise and vibrations generated from the spindle motor and the actuator. In another embodiment, the thin plate for the actuator has the same shape as the operating area of the actuator and contains ruffles to further dampen noise and vibrations generated from the pivot shaft of the actuator.

18 Claims, 11 Drawing Sheets

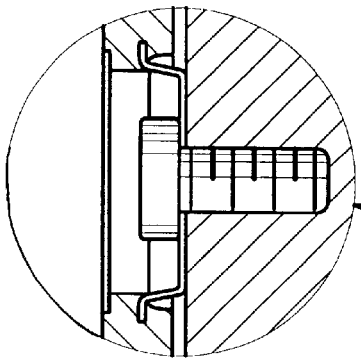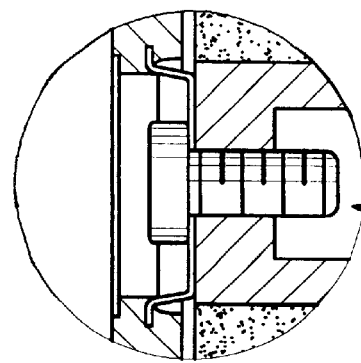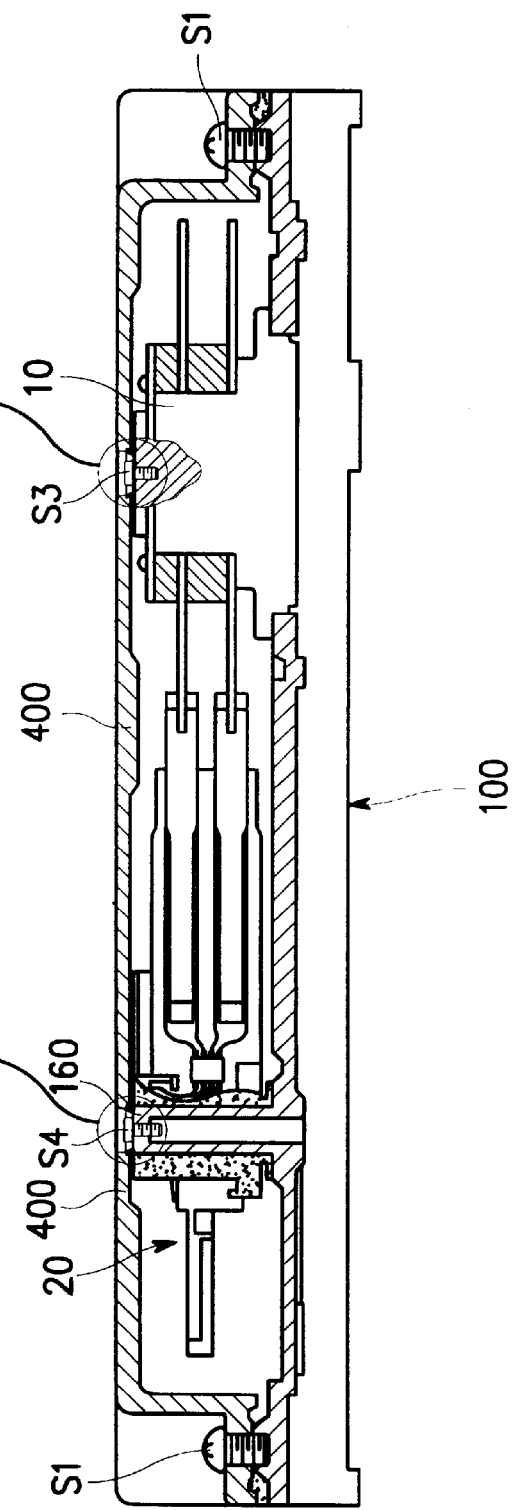

EASY TO MANUFACTURE COVERING DEVICE OF A HARD DISK DRIVE THAT DAMPENS VIBRATIONS AND SEALS INTERNAL COMPONENTS WITHIN

CLAIM OF PRIORITY

This application makes reference to, incorporates the same herein, and claims all benefits accruing under 35 U.S.C. §119 from an application for Covering Device of Hard Disk Drive earlier filed in the Korean Industrial Property Office on Apr. 11, 1998 and there duly assigned Serial No. 12940/1998.

BACKGROUND OF THE INVENTION

1. Field of the Invention

The present invention relates to a hard disk drive, and more particularly to a covering device of a hard disk drive, which is assembled to a base of the hard disk drive.

2. Description of the Related Art

Generally, a hard disk drive performing a function of an auxiliary memory is regarded as an important element of a computer. High capacity of a hard disk drive through high density recording is considered as an unavoidable factor in a multimedia environment of modem times. According to this, there is keen competition in the art of a hard disk drive, to occupy high ground where the situation of high capacity can be met by producing a new head and media through more innovative technical development.

A hard disk drive is a precise mechatronics product which has electronic parts and mechanical parts. The hard disk drive being used as one of auxiliary memories serves to record and reproduce information to and from a disk having magnetic susceptibility by transmitting a digital signal to a head which functions as an electromagnet.

However, the cover of the hard disk drive of the related art suffers from defects in that since the cover of the hard disk drive is manufactured by aluminum die casting, dimensional precision is deteriorated, and a post-process for removing a burr created when the cover is die-casted is additionally needed.

Further, since the separate coating must be applied to the cover after the aluminum die casting is completed, a high grade cleansing procedure has to be provided, which in turn increases manufacturing cost.

Also, the cover manufactured by die casting aluminum or press working a aluminum plate amplifies the vibration transferred thereto from the rotating shaft of the spindle motor and/or the pivot shaft of the actuator, thereby to boost vibration transmissibility. To overcome this problem, although a damper is used between the cover and the rotating shaft and/or the pivot shaft, since bond is used, outgasing is caused and manufacturing cost is increased.

In addition, even in the case that the cover is made of plastic according to the related art, vibration and noise generated when the spindle motor is rotated and the actuator is pivoted, are not sufficiently dampened, and rigidity thereof is reduced. Furthermore, since the cover is locked to the base by screws made of stainless steel, plastic particles are created and flowed into the hard disk drive when the screws are passed through locking holes defined in the cover. This creation of plastic particles and the inflow thereof into the hard disk drive severely diminishes reliability of the hard disk drive.

U.S. Pat. No. 5,483,397 for a Damping Configuration For Improved Disk Drive Performance to Gifford et al discloses a viscoelastic damper positioned within a hard disk drive enclosure in contact with the top cover of the disk enclosure and the top of the spindle shaft. However, the damper forms the shape of a solid washer. I have not seen the use of slits in a washer or a damper to more effectively reduce the noise and vibrations created during use of a hard disk drive. Also, I have not seen a damper for the pivot shaft of the actuator that is in the shape of the operating area of the actuator.

SUMMARY OF THE INVENTION

Accordingly, the present invention has been made in an effort to solve the problems occuring in the related art, and a primary object of the present invention is to provide a covering device of a hard disk drive, which can minimize vibration and noise generated when a spindle motor or an actuator is rotated.

Another object of the present invention is to provide a covering device of a hard disk drive, which can reduce manufacturing cost and improve productivity.

Still another object of the present invention is to provide a covering device of a hard disk drive, which can prevent unwanted plastic particles from being produced at a contact area between a cover and a base or when a screw is initially passed through a locking hole and hinder the inflow of the unwanted plastic particles into the hard disk drive.

It is yet another object to provide a covering device for a hard disk drive in the shape of a washer having slits extending radially from the outer radius of the washer inward in order to more effectively absorb the vibrations and noise created by the actuator and the spindle motor during operation of a hard disk drive.

It is still yet another object to produce a damper that attaches to the cover of a hard disk drive in the shape of the operating area of the actuator for positioning above the actuator, the damper containing repeating depressions and prominences in the form of a ruffle to reduce noise and vibrations generated by the actuator.

In order to achieve the above object, according to the present invention, there is provided a covering device of a hard disk drive including a spindle motor having a rotating shaft for rotating a disk, an actuator pivoting about a pivot shaft and having at its distal end a head for reading/writing data while pivoting over the disk, a base for mounting the spindle motor and the actuator thereon, and a cover locked to the base and made of plastic, the covering device comprising: at least one thin plate attached to the cover such that it is coaxially arranged with the rotating shaft and/or the pivot shaft, for dampening vibration and noise transferred from around the rotating shaft and/or the pivot shaft to the cover. The thin plate contains slits in it to more effectively reduce vibrations and noise generated from the hard disk drive. In a second embodiment, the thin plate for the actuator is in the shape of the operating area of the actuator and contains ridges and troughs throughout.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 4 and 4A together form a perspective view illustrating a cover of a hard disk drive wherein a first thin plate is attached to the cover in accordance with a first embodiment of the present invention;

FIGS. 7 through 7B together form a partially enlarged cross-sectional view illustrating a state in which the first thin plate is attached to the hard disk drive;

DETAILED DESCRIPTION OF THE INVENTION

Figure 1:
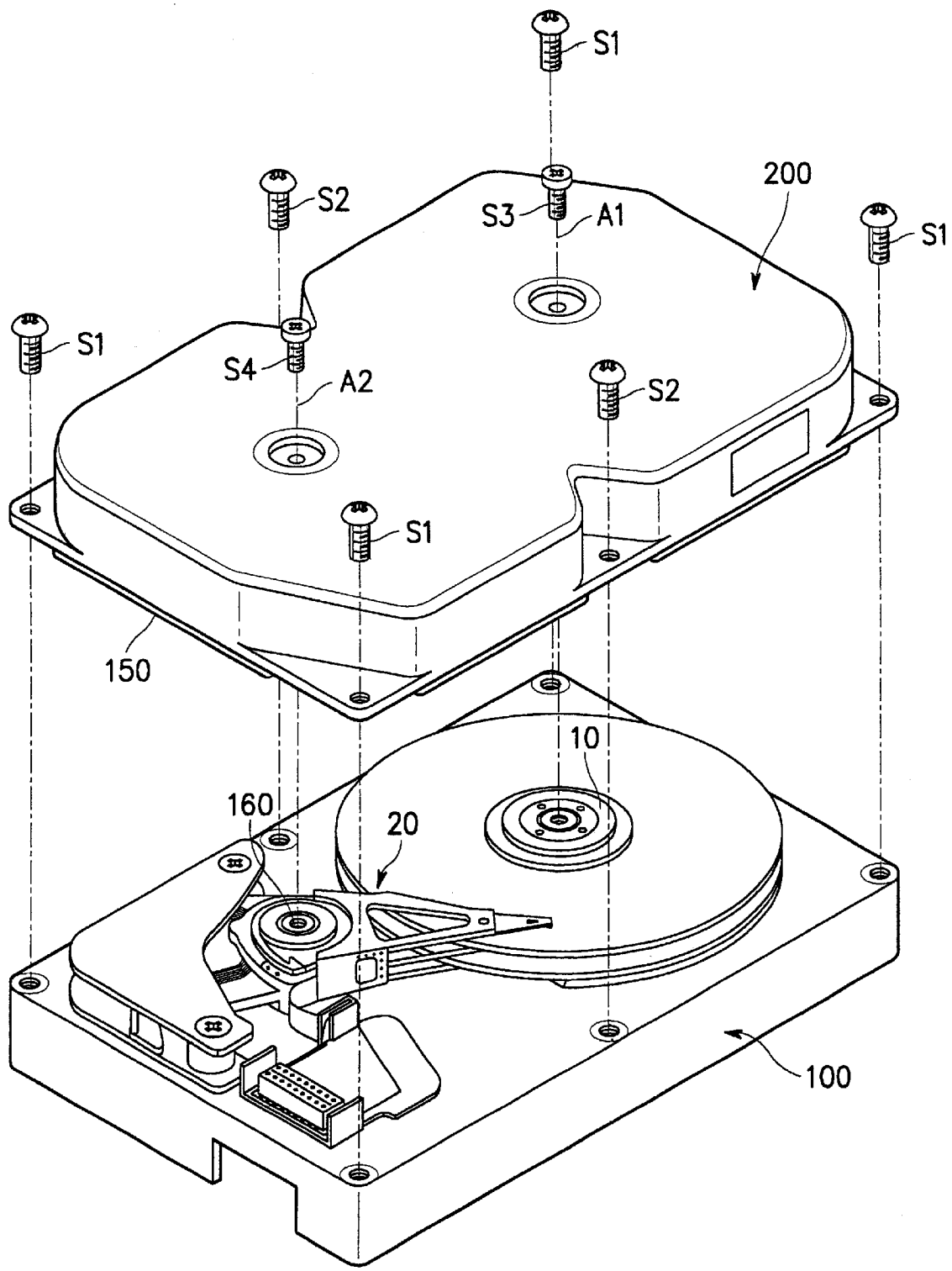
FIG. 1 an exploded perspective view illustrating a hard disk drive according to the related art.
Figure 2A:
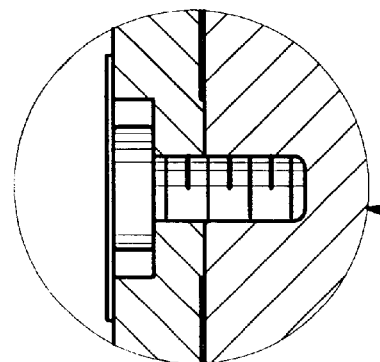
FIGS. 2 through 2B together form a partially enlarged cross-sectional view illustrating a structure of the hard disk drive of FIG. 1.
Figure 2B:
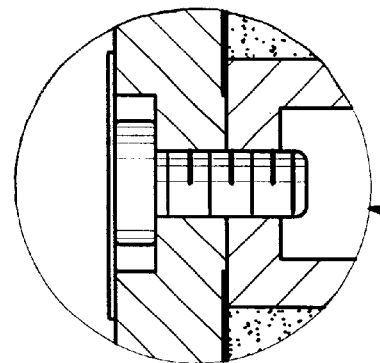
Figure 2:
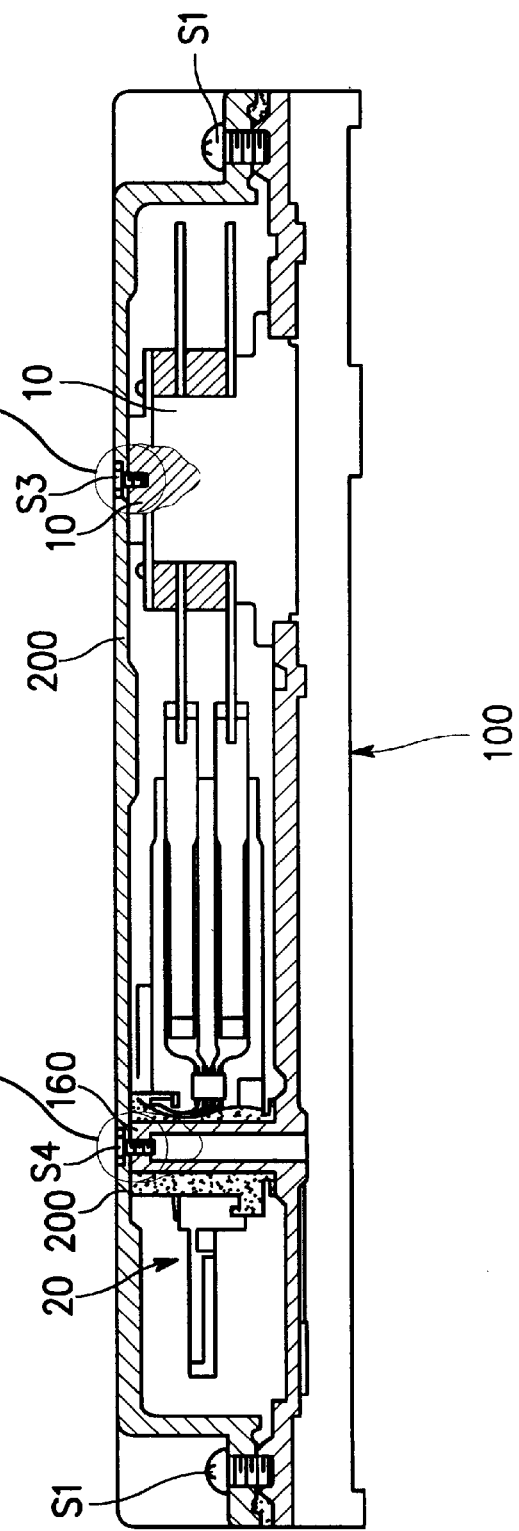

Referring to FIGS. 1 and 2 through 2B, there is illustrated a hard disk drive according to the related art.

As best shown in FIG. 1, the hard disk drive according to the related art includes a base 100, a cover 200 locked to the base 100, and a sealing gasket 150 intervened between the base 100 and the cover 200.

In the hard disk drive, an actuator 20 pivoting around a pivot shaft 160 is mounted to the base 100, and at least one disk rotating at high rotational velocity is mounted to a hub of a spindle motor 10.

The drawing reference numeral A1 represents a rotational axis of the spindle motor 10, and the drawing reference numeral A2 represents a pivot axis of the pivot shaft 160 of the actuator 20.

Figure 3:
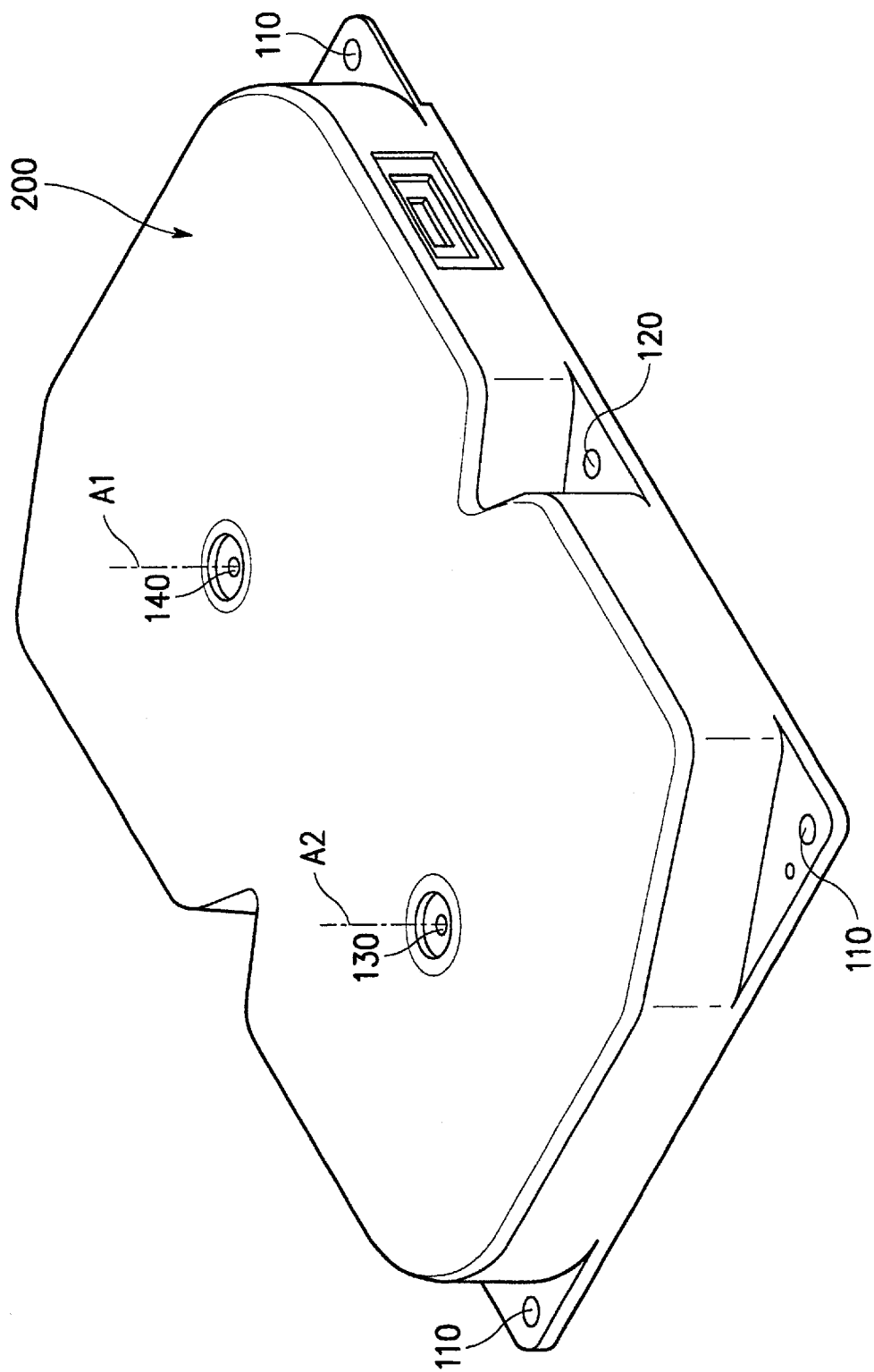
FIG. 3 is a perspective view illustrating an independent appearance of a cover of the hard disk drive of FIG. 1.

As shown in FIGS. 1 and 3, the cover 200 of the hard disk drive according to the related art is locked to the base 100 at eight supporting points by screws S1 through S4. In other words, the cover 200 is formed at its four corner portions with four locking holes 110, respectively, through which four screws S1 are to be passed to lock the cover 200 to the base 100. Also, the cover 200 is formed at middle portions of its two long sides with two locking holes 120, respectively, through which two screws S2 are to be passed to lock the cover 200 to the base 100, respectively. Further, the cover 200 is formed with two locking holes 130 and 140 in positions which correspond to the pivot axis of the pivot shaft 160 of the actuator 20 and the rotational axis of the spindle motor 10, respectively. Two screws S4 and S3 are passed through the locking holes 130 and 140 to lock the cover 200 to the pivot shaft 160 of the actuator 20 and the rotating shaft of the spindle motor 10, respectively.

At this time, the cover 200 according to the related art is manufactured by die casting of aluminum of about 120 g. Moreover, a lower surface of the cover 200 is applied with a coating for dampening vibration and noise generated when the spindle motor 10 is rotated at high rotational velocity and the actuator 20 is pivoted around the pivot shaft 160 and for resisting against corrosion of the base 100 and the cover 200.

Figure 4:
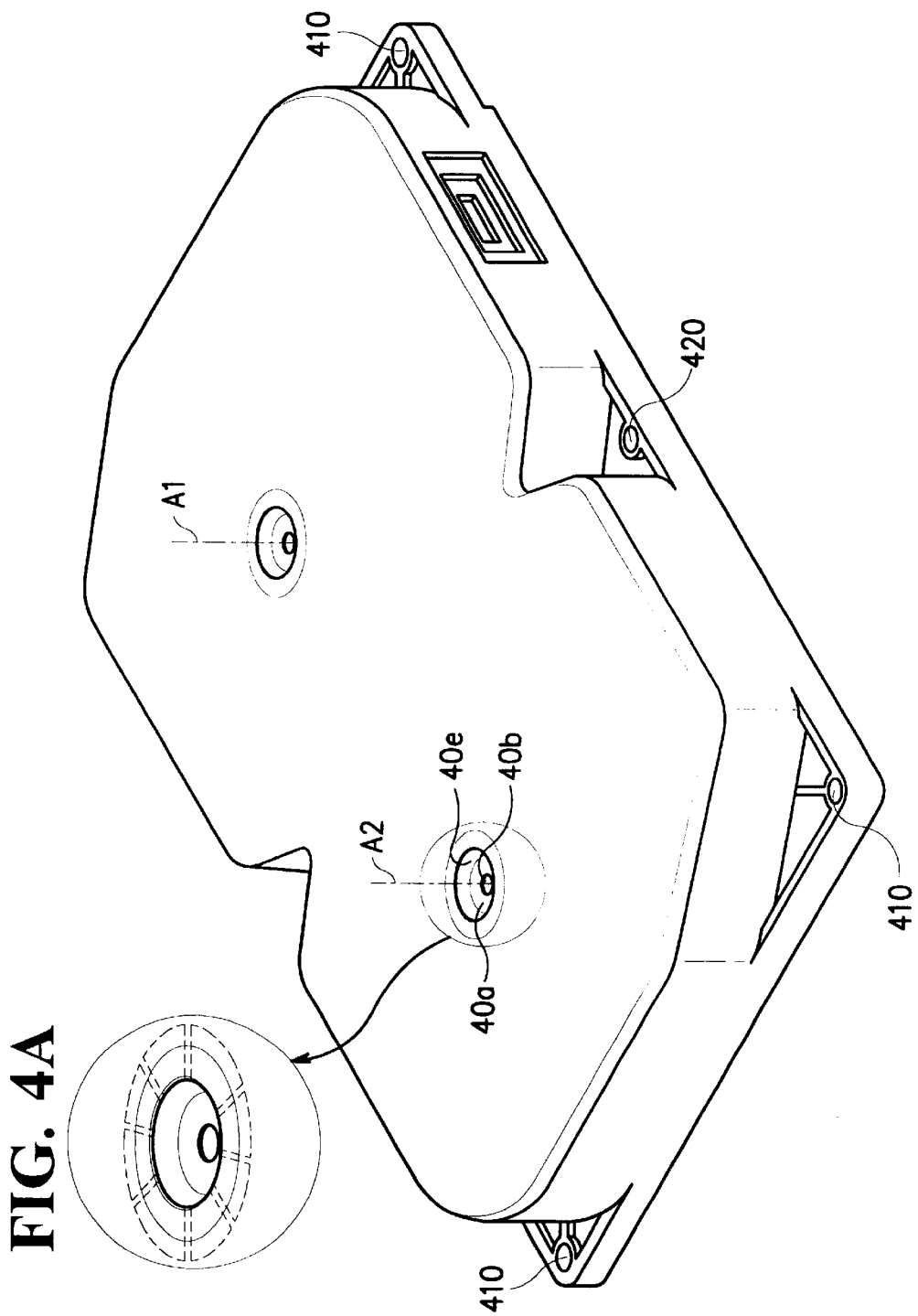
Figure 5:
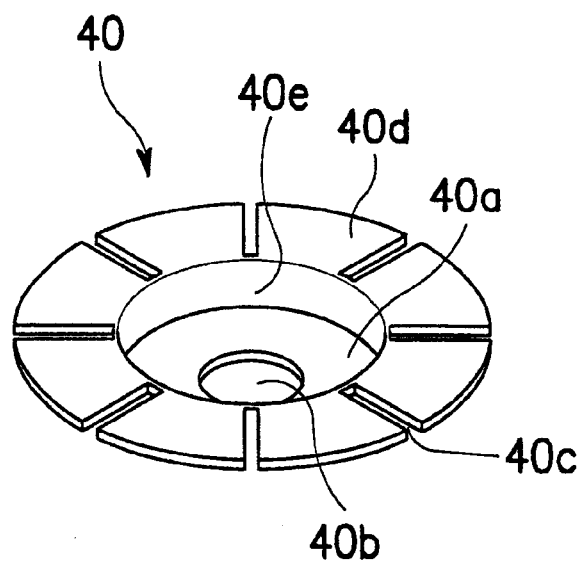
FIG. 5 is a perspective view illustrating an independent appearance of the first thin plate of FIG.4.
Figure 6:
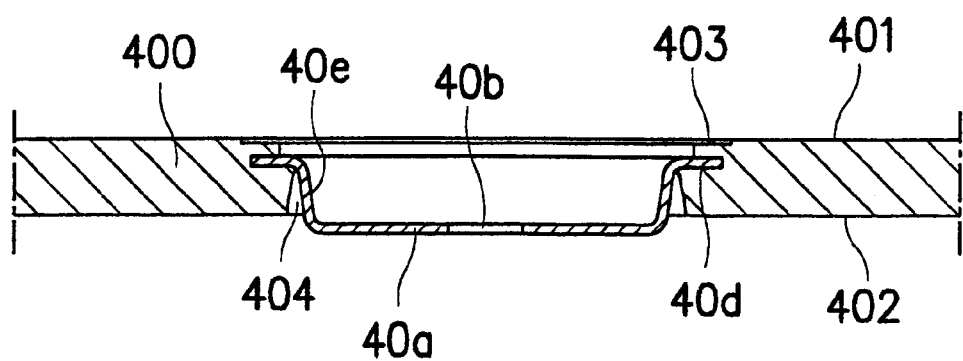
FIG. 6 is a partial cross-sectional view illustrating an installation structure of the first thin plate of FIG. 4.

FIGS. 4 and 4A together form a perspective view illustrating a cover of a hard disk drive wherein a first thin plate is attached to the cover in accordance with a first embodiment of the present invention. FIG. 5 is a perspective view illustrating an independent appearance of the first thin plate of FIGS. 4 and 4A. FIG. 6 is a partial cross-sectional view illustrating an installation structure of the first thin plate of FIGS. 4 and 4A.

As shown in FIGS. 4 and 4A, a cover 400 of a hard disk drive of the present invention is made of plastic, and is assembled to the base 100 at predetermined positions by a plurality of screws in a longitudinal direction.

The cover 400 is formed at its four corner portions with four locking holes 410, respectively, through which four screws are to be passed in the longitudinal direction to lock the cover 400 to the base 100. Also, the cover 400 is formed at middle portions of its two long sides with two locking holes 420, respectively, through which two screws are to be passed in the longitudinal direction to lock the cover 400 to the base 100, respectively. Further, the cover 400 is formed with a pair of openings 404 in positions which correspond to the rotating shaft of the spindle motor 10 and the pivot shaft 160 of the actuator 20, respectively.

According to the present invention, a pair of first plates 40 are provided to the pair of openings 404 such that their axes are in line with the rotational axis A1 of the spindle motor 10 and the pivot axis A2 of the pivot shaft 160 of the actuator 20, respectively, to dampen vibration and noise which are generated when the spindle motor 10 is rotated and the actuator 20 is pivoted around the pivot shaft 160. When the cover 400 is manufactured, the pair of first plates 40 are attached to cylindrical walls of the cover 400, which define the pair of openings 404, respectively, by insert molding.

As shown in FIG. 5, the first plate 40 according to the first embodiment of the present invention is a circular thin plate and is made of stainless steel. Each of the first thin plates 40 has a recessed bottom wall portion 40a, a cylindrical side wall portion 40e which is integrally formed at its lower end with the bottom wall portion 40a, and an outward flange portion 40d which is integrally formed at an upper end of the cylindrical side wall portion 40e. The recessed bottom wall portion 40a has a center opening 40b through which a screw is to be passed to lock the cover 400 to the rotating shaft of the spindle motor 10 or to the pivot shaft 160 of the actuator 20. A plurality of slits 40c are formed in the outward flange portion 40d such that they extend radially and are circumferentially spaced apart one from another. Since the vibration and noise due to the high rotational velocity of a hard disk drive disperse radially, slits 40c in first plate 40 can better absorb the vibration and noise more effectively than if the slits were not present.

As shown in FIG. 6, when the pair of first thin plates 40 are insert molded to the cover 400, the respective outward flange portions 40d each being formed with the plurality of slits 40c, are embedded into the cylindrical walls of the cover 400, which define the pair of openings 404, respectively, and the recessed bottom wall portions 40a project downward to some extent beyond a lower surface 402 of the cover 400.

A pair of circular recesses 403 to each of which a sealing label is to be attached, are formed around the pair of openings 404 on an upper surface of the cover 400, respectively. The pair of first thin plates 40 are arranged below the pair of circular recesses 403, respectively. Further, as described above, the bottom wall portions 40a of the first thin plates 40 project downward to some extent beyond the lower surface 402 of the cover 400.

As shown in FIGS. 7 through 7B, the first thin plates 40 which are insert molded to the cover 400, are fastened to the rotating shaft of the spindle motor 10 and the pivot shaft 160 of the actuator 20 by the screws S3 and S4 which pass through the center openings 40b, respectively. At this time, since the screws S3 and S4 and the first thin plates 40 are made of the same material, outside particles are prevented from flowing into the hard disk drive. This is because a contact between elements which are made of the same material renders an excellent sealing effect.

Moreover, due to the fact that vibration and noise generated when the rotating shaft of the spindle motor 10 is rotated and the pivot shaft 160 of the actuator 20 is pivoted are absorbed by the first thin plates 40 to be transferred to the cover 400, the vibration and noise are dampened by the plastic cover 400.

Figure 8:
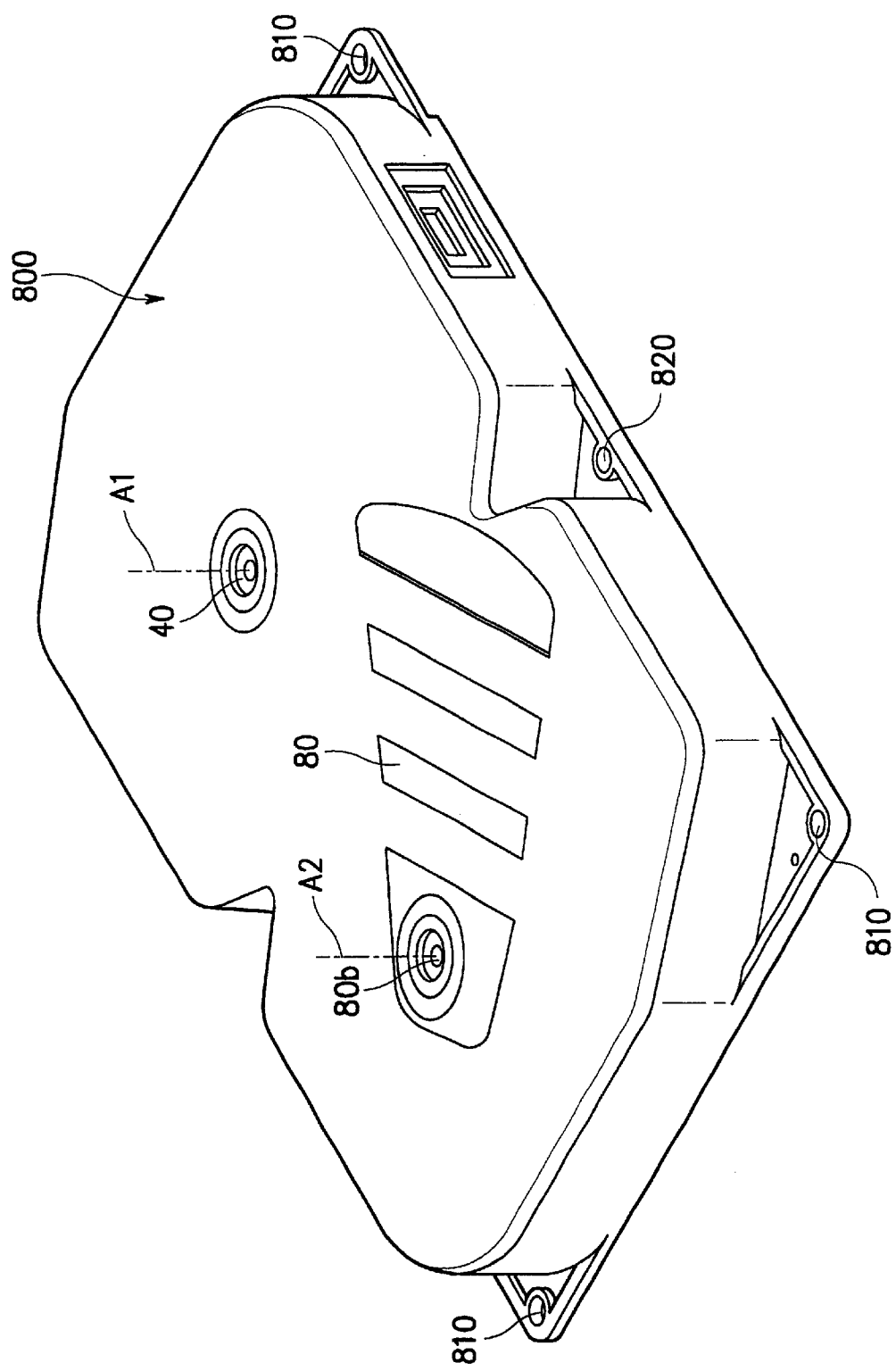
FIG. 8 is a perspective view illustrating a cover of a hard disk drive wherein a second thin plate is attached to the cover in accordance with a second embodiment of the present invention.
Figure 9:
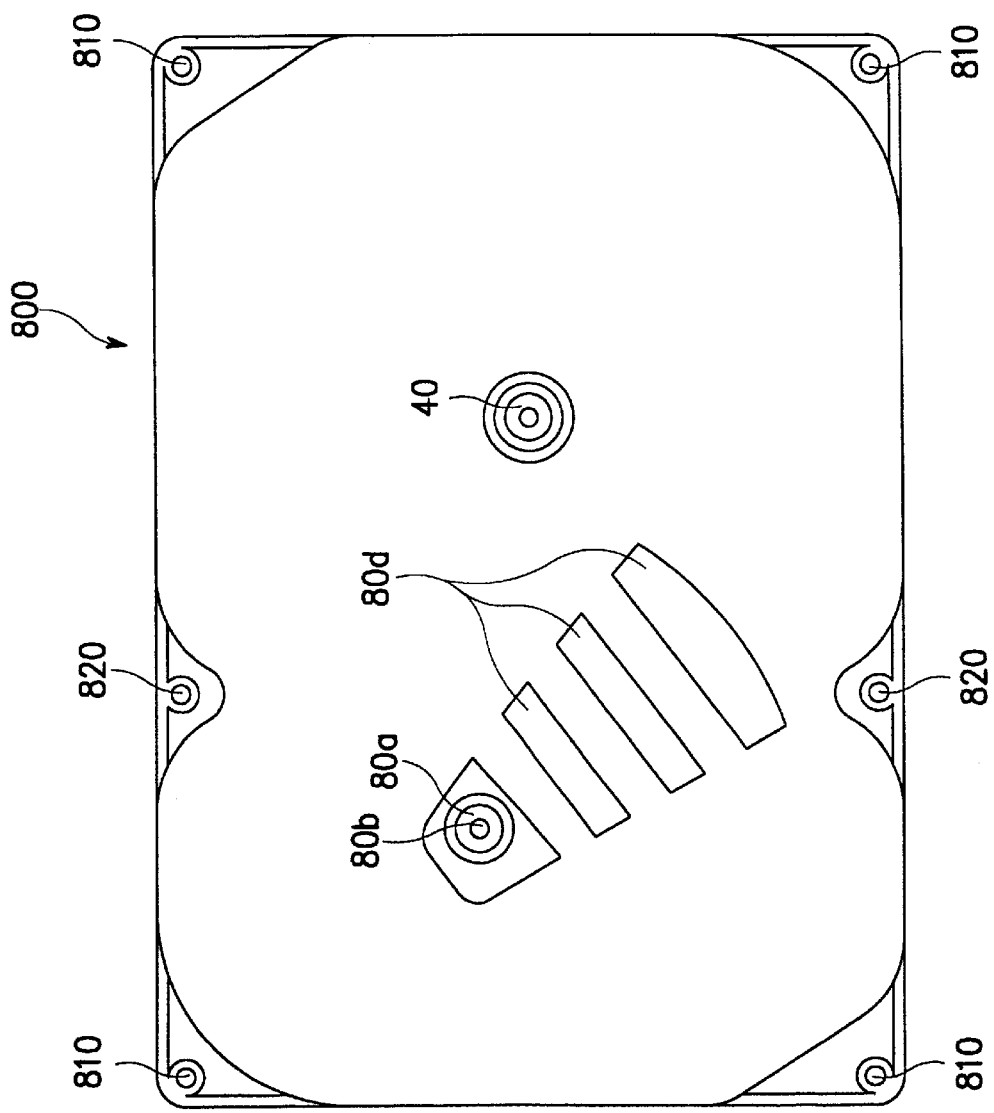
FIG. 9 is a plan view of FIG. 8.
Figure 10:
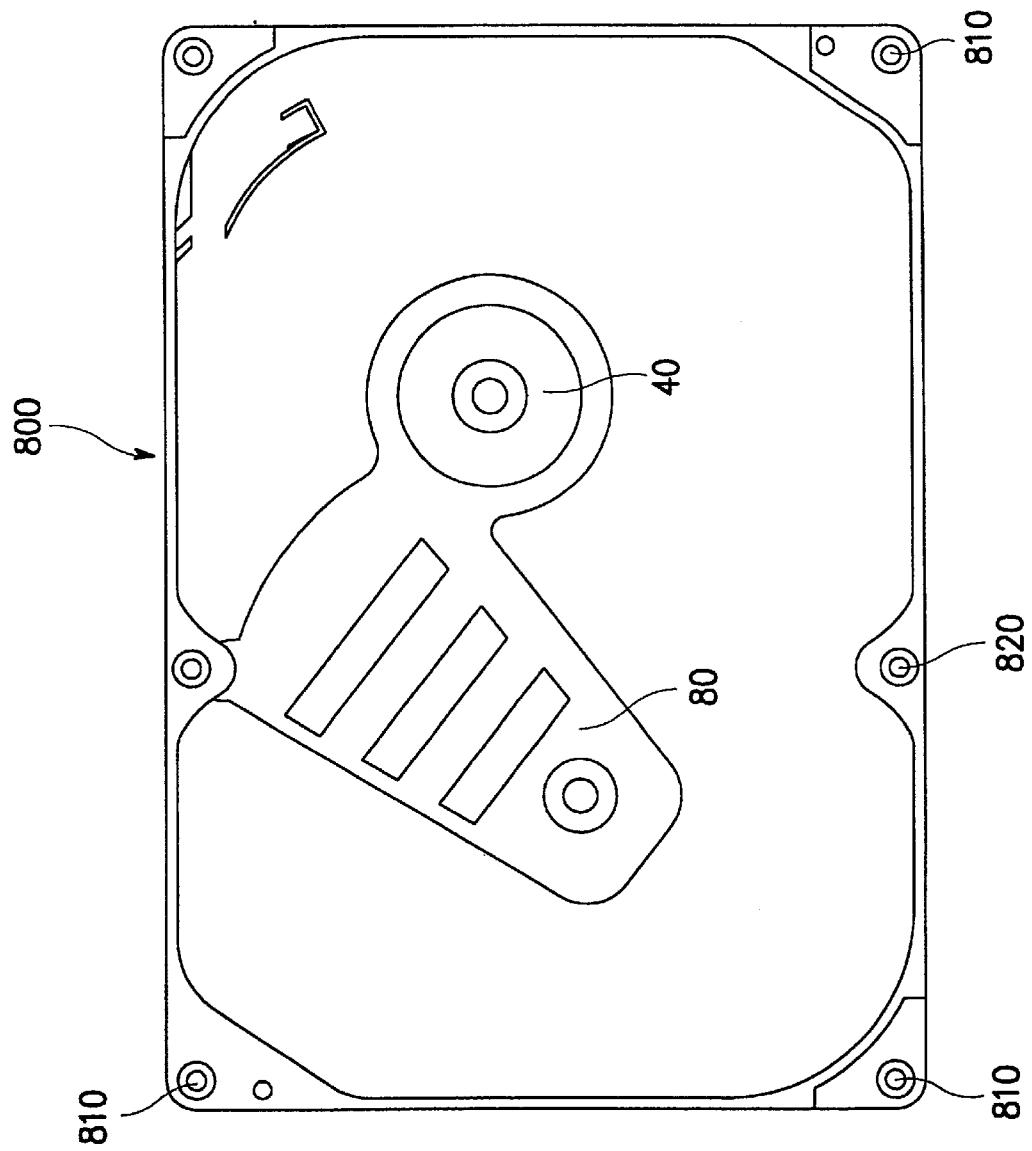
FIG. 10 is a bottom view of FIG. 8.

FIG. 8 is a perspective view illustrating a cover of a hard disk drive wherein a second thin plate is attached to the cover in accordance with a second embodiment of the present invention. FIG. 9 is a plan view of FIG. 8. FIG. 10 is a bottom view of FIG. 8.

A cover 800 according to the present embodiment is formed at its four corner portions with four locking holes 810, respectively, through which four screws are to be passed in the longitudinal direction to lock the cover 800 to a base. Also, the cover 800 is formed at middle portions of its two long sides with two locking holes 820, respectively, through which two screws are to be passed in the longitudinal direction to lock the cover 800 to the base, respectively.

As shown in FIGS. 8 through 10, the first thin plate 40 according to the first embodiment is insert molded to the cover 800 such that its axis is in line with the rotational axis A1 of the spindle motor 10, and a second thin plate 80 according to this second embodiment is provided over an operating area of the actuator 20. The second thin plate 80 has a configuration which is different from that of the first thin plate 40.

Upon operation of the hard disk drive, when the rotating shaft of the spindle motor 10 is rotated, vibration and noise are generated from around the rotational axis A1, and when the actuator 20 is pivoted around the pivot axis A2, vibration and noise are generated from the operating area of the actuator 20.

In other words, the operating area of the actuator 20 which is pivoted around the pivot axis A2 has a sector-shaped contour, and according to this, the second thin plate 80 is manufactured to have a sector-shaped configuration to be insert molded to the cover 800.

The second thin plate 80 is provided for dampening the vibration and noise generated from the operating area having the sector-shaped contour when the actuator 20 is pivoted around the pivot axis A2. The second thin plate 80 is made of the same material as the first thin plate 40. When the second thin plate 80 is locked to the pivot shaft 160 of the actuator 20 by a screw, since the screw and the second thin plate 80 are made of the same material, satisfiable sealing effect is obtained. This is because a contact between elements which are made of the same material renders an excellent sealing effect.

Figure 11:
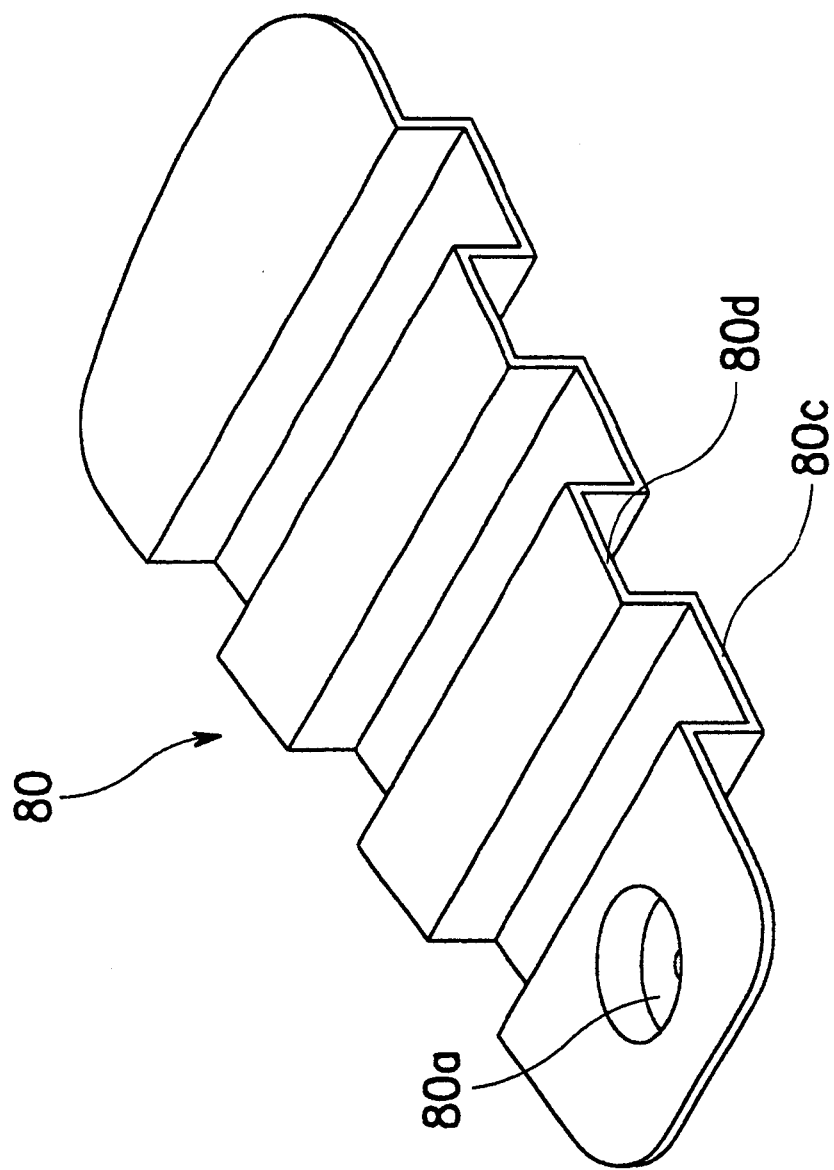
FIG. 11 is a perspective view illustrating an independent appearance of the second thin plate of FIG. 8.
Figure 12:
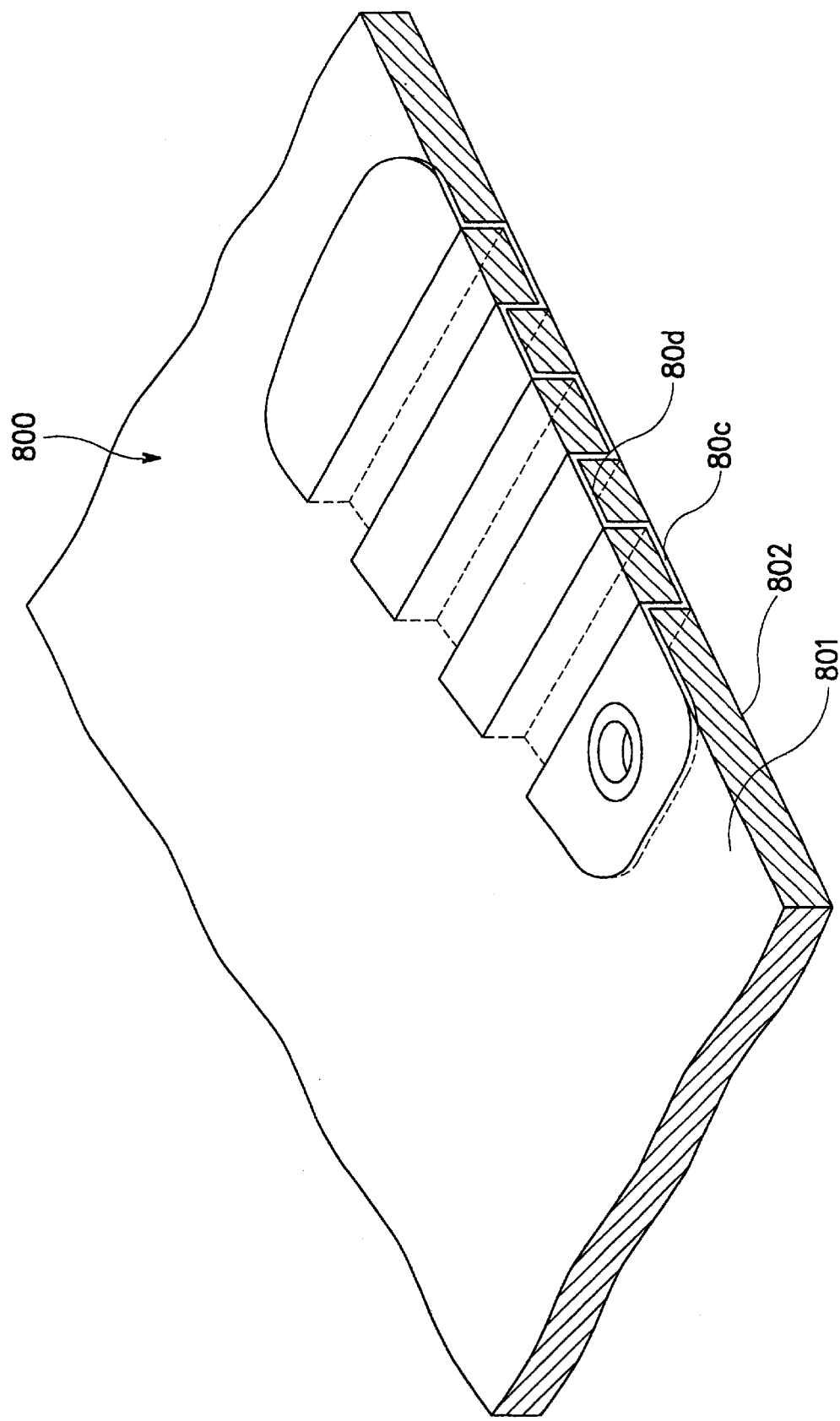
FIG. 12 is a partially broken away and sectioned perspective view illustrating a state in which the second thin plate is attached to the hard disk drive.

As shown in FIGS. 11 and 12, the second thin plate 80 which is insert molded to the cover 800, has a plurality of prominences 80d and depressions 80c which are alternately formed such that they are positioned above the operating area of the actuator 20 for dampening vibration and noise generated from the operating area. The plurality of prominences 80d and depressions 80c effectively absorb the vibration and noise after the second thin plate 80 is insert molded to the cover 800.

The second thin plate 80 has at its one end a circular bottom wall portion 80a having a center opening 80b and a cylindrical side wall portion integrally formed at its lower end with the circular bottom wall portion 80a and at its upper end with the plurality of prominences 80d and depressions 80c. The circular bottom wall portion 80a and the cylindrical side wall portion are coaxially arranged with the pivot shaft 160 of the actuator 20 for dampening vibration and noise generated from around the pivot shaft 160.

When the cover 800 is assembled to the base, the circular bottom wall portion 80a faces the pivot shaft 160 of the actuator 20, and the plurality of prominences 80d and depressions 80c face the actuator 20. In addition, when the second thin plate 80 is insert molded to the cover 800, the depressions 80c are exposed to the outside on the lower surface of the cover 800 and the prominences 80d are exposed to the outside on the upper surface of the cover 800.

As a result, the covering device of the present invention has a structure that the thin plates made of a material which is different from that of the cover, are attached to the cover by insert molding, in consideration of transfer directions of vibration and noise generated when the spindle motor and/or the actuator are rotated, to thereby minimize them.

Hence, as described above, the covering device of the hard disk drive according to the present invention provides advantages in that since at least one thin plate made of a material which is different from that of a cover, is attached to the cover by insert molding in consideration of transfer directions of vibration and noise generated when a spindle motor and/or a actuator is rotated, the vibration and noise are effectively minimized. Further, according to the present invention, productivity and reliability of the end product are improved.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A covering device of a hard disk drive including a spindle motor having a rotating shaft for rotating a disk, an actuator pivoting about a pivot shaft and having at its distal end a head for reading/writing data while pivoting over the disk, a base for mounting the spindle motor and the actuator thereon, and a cover locked to the base and made of plastic, the covering device comprising:

at least one thin plate attached to the cover such that it is coaxially arranged with the rotating shaft and/or the pivot shaft, for dampening vibration and noise transferred from around the rotating shaft and/or the pivot shaft to the cover, wherein the thin plate has a circular bottom wall portion having a center opening, a cylindrical side wall portion integrally formed at its lower end with the bottom wall portion, and an outward flange portion formed at an upper end of the cylindrical side wall portion and having a plurality of slits which extend radially and are circumferentially spaced apart one from another.

2. The covering device as claimed in claim 1, wherein the thin plate is made of the same material as the rotating shaft and/or the pivot shaft.

3. The covering device as claimed in claim 1, wherein the thin plate is attached to the cover by insert molding.

4. The covering device as claimed in claim 1, wherein the cover is locked to the base by a plurality of screws made of the same material as the thin plate.

5. The covering device as claimed in claim 1, wherein the thin plate is made of stainless steel.

6. A covering device of a hard disk drive including a spindle motor having a rotating shaft for rotating a disk, an actuator pivoting about a pivot shaft and having at its distal end a head for reading/writing data while pivoting over the disk, a base for mounting the spindle motor and the actuator thereon, and a cover locked to the base and made of plastic, the covering device comprising:

a first thin plate attached to the cover such that it is coaxially arranged with the rotating shaft of the spindle motor, for dampening vibration and noise transferred from around the rotating shaft of the spindle motor to the cover, wherein the first thin plate has a circular bottom wall portion having a center opening, a cylindrical side wall portion integrally formed at its lower end with the bottom wall portion, and an outward flange portion formed at an upper end of the cylindrical side wall portion and having a plurality of slits which extend radially and are circumferentially spaced apart one from another.

7. The covering device as claimed in claim 6, wherein a second thin plate is further attached to the cover such that it is coaxially arranged with the pivot shaft of the actuator, for dampening vibration and noise transferred from around the pivot shaft of the actuator to the cover while the actuator is operated, wherein the second thin plate has a circular bottom wall portion having a center opening, a cylindrical side wall portion integrally formed at its lower end with the bottom wall portion, and an outward flange portion formed at an upper end of the cylindrical side wall portion and having a plurality of slits which extend radially and are circumferentially spaced apart one from another.

8. The covering device as claimed in claim 7, wherein the first and the second thin plates are made of the same material as the rotating shaft and the pivot shaft.

9. The covering device as claimed in claim 7, wherein the first and the second thin plates are attached to the cover by insert molding.

10. The covering device as claimed in claim 7, wherein the first and the second thin plates are made of stainless steel.

11. A covering device of a hard disk drive including a spindle motor having a rotating shaft for rotating a disk, an actuator pivoting about a pivot shaft and having at its distal end a head for reading/writing data while pivoting over the disk, a base for mounting the spindle motor and the actuator thereon, and a cover locked to the base and made of plastic, the covering device comprising:

a first thin plate attached to the cover such that it is positioned above an operating area of the actuator, for dampening vibration and noise transferred from around the pivot shaft of the actuator and from the operating area of the actuator to the cover, wherein the first thin plate has a plurality of prominences and depressions which are alternately formed such that they are positioned above the operating area of the actuator for dampening vibration and noise generated from the operating area.

12. The covering device as claimed in claim 11, wherein the first thin plate has the same area as the operating area of the actuator.

13. The covering device as claimed in claim 11, wherein the first thin plate has a circular bottom wall portion having a center opening and a cylindrical side wall portion integrally formed at its lower end with the circular bottom wall portion and at its upper end with the plurality of prominences and depressions such that they are coaxially arranged with the pivot shaft of the actuator for dampening vibration and noise generated from around the pivot shaft.

14. The covering device as claimed in claim 13 wherein each of the prominences and depressions is filled with plastic.

15. The covering device as claimed in claim 11, wherein the first thin plate is made of the same material as the pivot shaft of the actuator.

16. The covering device as claimed in claim 11, wherein the first thin plate is attached to the cover by insert molding.

17. The covering device as claimed in claim 11, wherein the first thin plate is made of stainless steel.

18. The covering device as claimed in claim 11, further comprising a second thin plate attached to the cover such that it is coaxially arranged with the rotating shaft of the spindle motor, for dampening vibration and noise transferred from around the rotating shaft of the spindle motor to the cover, wherein the second thin plate has a circular bottom wall portion having a center opening, a cylindrical side wall portion integrally formed at its lower end with the bottom wall portion, and an outward flange portion formed at an upper end of the cylindrical side wall portion and having a plurality of slits which extend radially and are circumferentially spaced apart one from another.

* * * * *